United States Patent [19]

Bradshaw et al.

[11] 4,402,332

[45] Sep. 6, 1983

[54] APPARATUS FOR HEAT ENERGY RECOVERY FROM ESCAPING STEAM

[75] Inventors: Norman F. Bradshaw, Surrey, England; Gerald P. Schrubba, Huntington Woods, Mich.

[73] Assignee: Haden Schweitzer Corporation, Madison Heights, Mich.

[21] Appl. No.: 218,393

[22] Filed: Dec. 19, 1980

[51] Int. Cl.³ .............................................. B08B 3/02
[52] U.S. Cl. ................................... 134/104; 134/105; 165/47
[58] Field of Search .................... 134/105, 104, 83, 76, 134/123, 45; 165/47; 34/86; 98/115 SB

[56] References Cited

U.S. PATENT DOCUMENTS 3,343,477 9/1967 Ekstam ........................... 134/105 X
3,934,432 1/1976 Fleissner .......................... 134/105 X Primary Examiner—Robert L. Bleutge
Attorney, Agent, or Firm—Krass, Young & Schivley

[57] ABSTRACT

An apparatus is disclosed for condensing steam emissions from industrial process sites such as in pretreatment plants for painting of car bodies. This includes the formation of a water spray curtain extending across the entrance and exit sections of a pretreatment plant to absorb and condense the steam emissions. The collected spray water is circulated through a heat recovery system such that the heat energy of the absorbed steam is transferred out of the water and heat utilizing processes such as in the heating of the solutions utilized the spray treatment plant itself. The pretreatment plants also include an overhead slot through which conveyor carriers pass, and a condenser surface arrangement is employed to eliminate the escape of steam through this slot, including cooled surfaces converging above and adjacent to the slot. The surfaces are cooled by internal circulation of a cooling liquid. The water generated by the steam condensing on the surfaces is diverted by an overhead panel. The cooling liquid is circulated to a heat recovery system such that the heat energy may be transferred into a heat utilizing process such as a preheater for the air supplied to a paint spray booth.

4 Claims, 4 Drawing Figures

APPARATUS FOR HEAT ENERGY RECOVERY FROM ESCAPING STEAM

BACKGROUND DISCUSSION

There are many industrial processes wherein large volumes of steam emissions are generated at the process site, in which steam escapes into the surrounding air space and thence is removed by fan exhausting to the atmosphere. The resultant condensation above the plant roof is sometimes troublesome. Furthermore, the heat energy represented by the escaping steam is considerable and given the current trends resulting in extremely high energy costs, such loss of energy represents a considerable cost.

If the heat energy could be employed to offset the energy demands somewhere else in the plant, considerable cost savings could be realized.

Such a situation is found in pretreatment plants for the treatment of automotive car bodies prior to the application of paint finishes in production finishing operations.

Such pretreatment plants typically take the form of a long in-plant tunnel or casing through which car bodies or other items to be treated are suspended from an overhead chain conveyor having carrier hooks extending through a slotted opening on top of the casing. The pretreatment typically involves the spray treatment of relatively high temperature sprays containing various chemicals for preparation of the surfaces to be painted. These liquids are usually water solutions and large volumes of steam emissions are produced by the spraying operation. The car bodies thence progress to a final rinsing spray just prior to exiting from the pretreatment plant. The large volumes of steam emissions have a tendency to pass out through the tunnel at either end thereof into the plant space.

Accordingly, conventionally there is provided air seals with air jets preventing the steam from passing out through the entrance and exit sections. An exhaust fan exhausts the air space within the pretreatment plant to the atmosphere exhausting the steam emissions over the plant roof.

The overhead slot for the conveyor carriers represent a potential leak point for the steam emissions. Conventionally, an air jet arrangement is also employed along the slot to preclude the exiting of steam into the surrounding plant area.

Also, certain wiper-seal arrangements have been employed towards this same end.

Thus, the considerable heat energy of the steam is entirely lost from the process, as is the water condensate.

Accordingly, it is an object of the present invention to provide a method and apparatus for both sealing a space within which steam is released such as to preclude the escape of steam emissions into the surrounding areas and also to recover the heat energy of the steam.

SUMMARY OF THE INVENTION

This and other objects of the present invention, which will become apparent upon a reading of the following specification and claims, are achieved by a method and apparatus which comprises employing cold water "curtains" formed by an array of cold water sprays closing off the entrance and exit openings into the space. The steam, upon encountering the cold water spray, is condensed thereinto. The cold water spray is recirculated and continuously passed through a heat recovery system which may be comprised of a heat exchanger which removes the heat energy released into the water upon condensing of the steam. Such heat energy recovery unit may be comprised of a heat exchanger. The heat energy removed in the heat exchanger is transferred into a low energy heat utilizing process such as a heater for heating the solutions utilized in the pretreatment system.

Alternatively, the heat energy may be recovered by the use of a heat pump in which heat energy is pumped to a higher temperature in order to provide a greater degree of flexibility and utilization of the heat energy.

The method and apparatus also includes the provision of a cooled condenser surface consisting of converging surfaces arranged longitudinally along the overhead slot in the casing, with a cooling liquid circulated through tubes mounted beneath the surfaces such as to provide cooled surfaces to enable condensation of the steam moving towards the conveyor slot. The diverging surfaces enable the condensate to flow outwardly down the surfaces and onto a diverter panel to direct the condensate flow outwardly and away from the interior of the pretreatment system.

The heat energy which is released into the condenser surfaces is collected by means of circulation of the cooling liquid to a heat recovery arrangement which may take the form of a heat exchanger transferring heat into a heat transfer medium flow and thence into a heat utilizing process site such as to preheat the incoming air of the paint spray booths during wintertime operation.

A heat pump may also be employed to recover the heat energy given up into the heat transfer medium flow by the condensing steam.

DESCRIPTION OF THE DRAWINGS

FIG. 3 is a diagrammatic representation of an alternate arrangement of the heat energy recovery system associated with the entrance/exit steam sealing arrangement.

FIG. 4 is a block diagrammatic representation of a heat energy recovery system associated with the overhead slot steam sealing arrangement.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
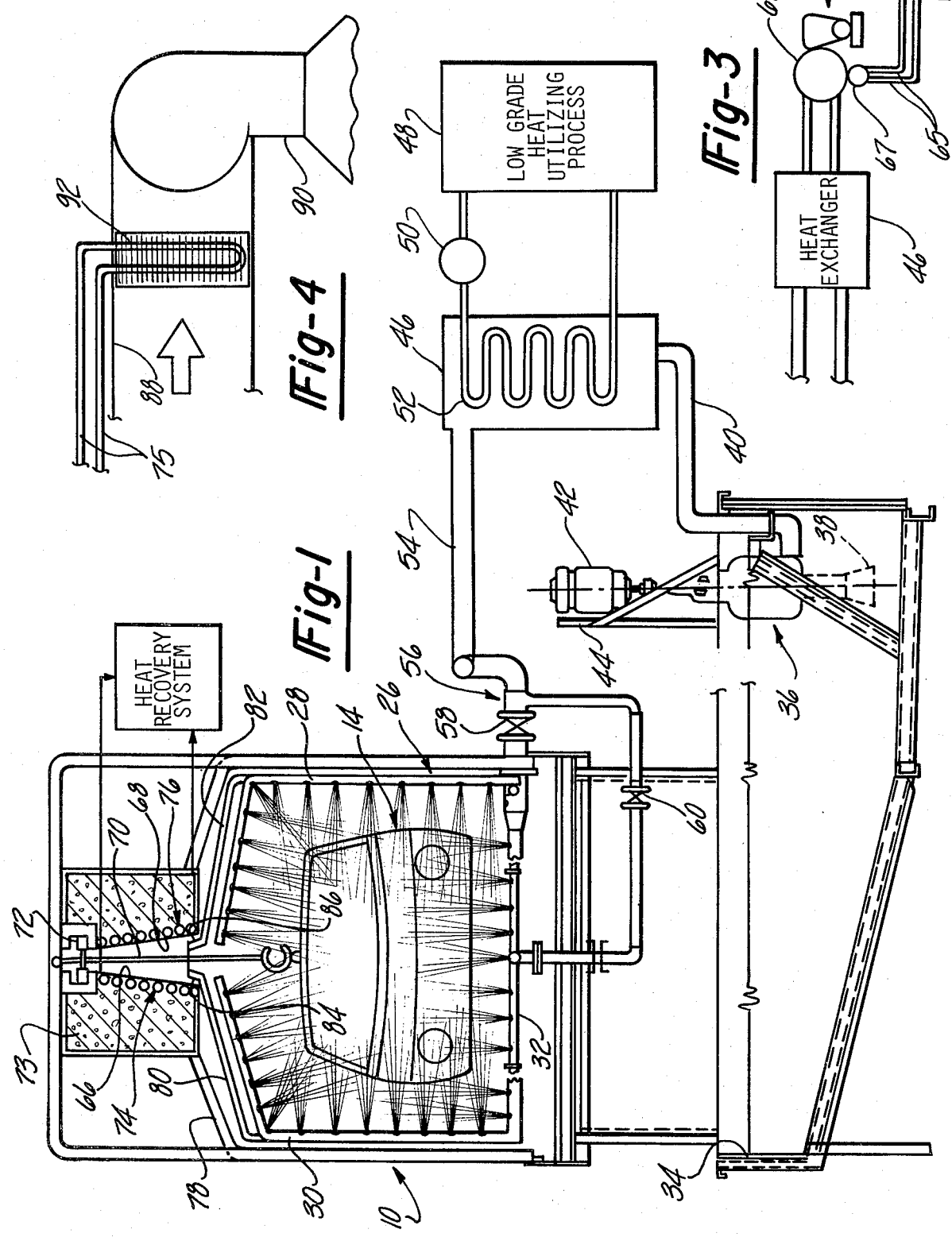
FIG. 1 is a diagrammatic plan view of the pretreatment plant into which a steam sealing arrangement according to the present invention is incorporated.
Figure 2:
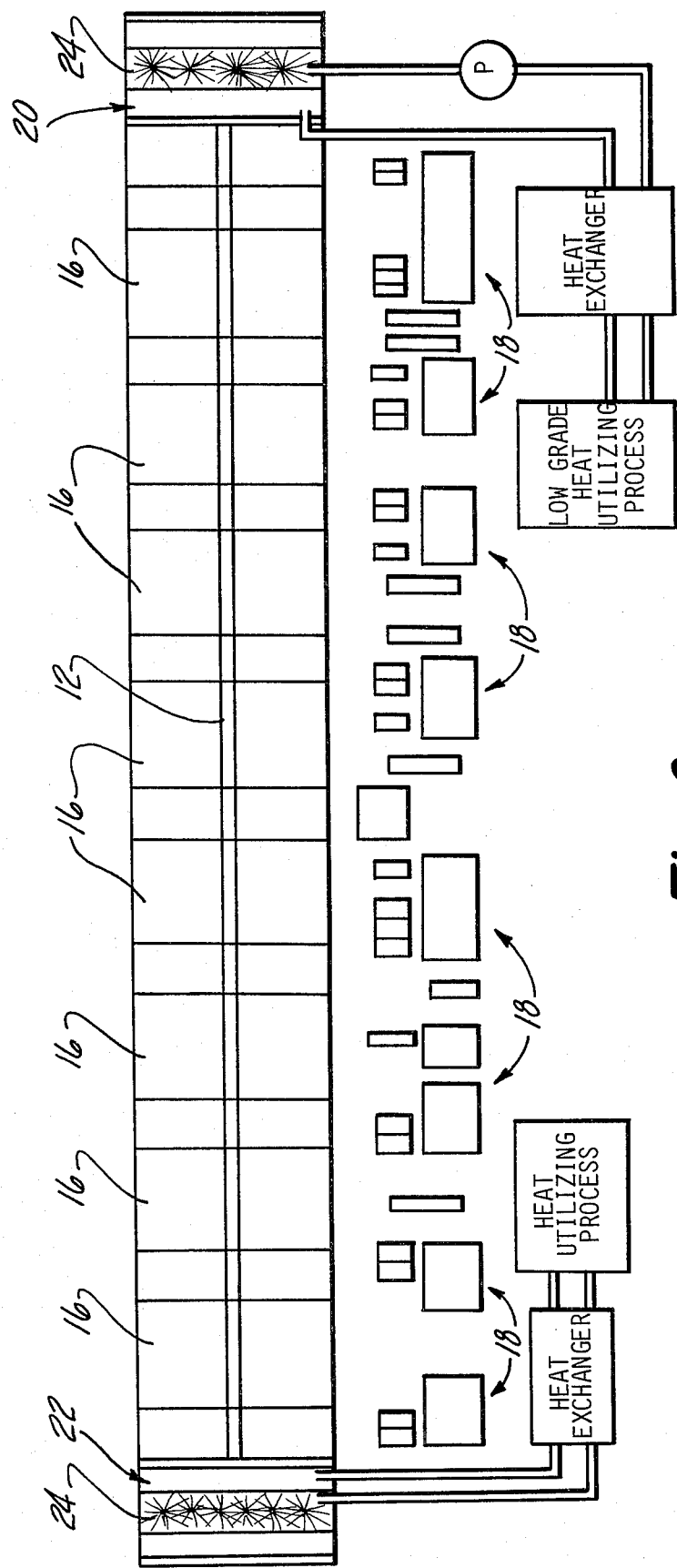
FIG. 2 is a sectional view taken through the pretreatment plant depicting the operation of the arrangement for the entrance/exit openings thereof as well as the overhead slot steam sealing arrangement, together with a block diagrammatic representation of the heat energy recovery system associated therewith.

Referring to the drawings and particularly FIGS. 1 and 2, the arrangement according to the present invention will be described in connection with a typical pretreatment plant described above including a tunnel enclosure 10 of sheet metal covered steel frame construction, over which a conveyor is mounted, the tunnel enclosure 10 having a central slot 12 through which are disposed conveyor carriers with support hooks carrying automobile bodies indicated at 14 in FIG. 1.

Various stations along the length of the pretreatment plant conduct various spray pretreatments, each station being indicated diagrammatically at 16. This treatment is for example a washing, rinsing or phosphate solution spray, typically alternated with wetting sprays between the stations. Various associated tank, pump and other equipment generally indicated at 18 are associated with each such station 16.

In these processes, the water and water solution sprays are commonly at elevated temperatures, i.e., 180° F. or higher.

According to the concept of the present invention, the workpieces are conveyed by the conveyor from an entrance section 20 through each station 16, and pass out through an exit section 22.

According to the concept of the present invention, the entrance section 20 and exit section 22 are each provided with water "curtains" formed by cold water spray arrays 24 and 26. Each of the cold water spray arrays 24 and 26 comprises an arrangement of distributor piping including two stand pipes 28 and 30 extending upwardly along either sidewall of the tunnel enclosure 10 and including upper portions extending over the top thereof.

A bottom-mounted manifold pipe 32 extends across the bottom of the tunnel enclosure area. Each of the pipes 28, 30 and 32 is provided with appropriate nozzles such as to provide a substantially complete coverage of the entrance and exit sections 20 and 22, respectively, such that steam emissions tending to move along the tunnel enclosure 10 and pass out through the entrance or exit sections 20 or 22 encounter the cold water in the spray and are caused to be condensed and absorbed into the spray.

The water passes down into a collecting sump tank 34. Mounted within the sump tank 34 is a circulation pump 36 having an intake 38 extending into the lower regions of the sump tank 34 such as to draw the condensed water out through the outlet pipe 40.

The circulation pump 36 is driven by an electric motor mounted on a mounting framework 44 situated above the sump tank 34.

The return water in outlet pipe 40 is circulated within a heat exchanger 46 and comprises a part of the recovery means associated with the water collected from the cold water sprays which has been heated by the condensing and absorbing of the steam thereinto. The heat energy recovery system is employed to remove the heat energy such as to maintain the temperature of the water at relatively cool levels and utilize such energy in low grade heat application as represented in block 48.

The heat recovery means further includes a circulation pump 50 circulating a transfer medium through coils 52 included within the heat exchanger 46. The return pipe 54 receives the water after passing through the heat exchanger 46 and thence is distributed through a distribution pipe network 56 with appropriate control valving 58 and 60 to the pipes 28, 30 and 32.

It should be understood that a level control (not shown) also is employed to add or remove water as needed to meet the demands of the system and to eliminate excess water created by the condensing of steam emissions.

A low grade heat utilization process 48 may be comprised of heating of the hot water solutions utilized in the process equipment 18 since such treatment stages often include treating solutions at temperature levels on the order of 160°–180 F.

The heat energy may also be employed in heat utilizing processes requiring higher temperatures by an alternate arrangement depicted in FIG. 3 in which the heat exchanger 46 directs a heat transfer medium flow about the condenser coils 62 associated with a heat pump 64 such that the heat utilizing process indicated by block 48 may receive relatively high temperature heat transfer media via lines 65 associated with a condenser coil 67 of the heat pump 64.

In the second aspect of the method and apparatus of the present invention, a steam sealing and energy recovery system are provided for eliminating the escape of steam emissions through the central slot 12. As seen in FIG. 1, the central slot 12 is bounded by converging condenser surfaces 66 and 68 which extend along the length of the tunnel enclosure 10. The converging condenser surface 66 and 68 are further apart adjacent the lower edges thereof than the top edges. The clearance space therebetween provides an opening through which a hanger may extend, supported on conveyor rollers 72 such as to enable advance of the workpieces while supported on the conveyor rollers 72.

Sloping condenser surfaces 66 and 68 are cooled by the provision of internal cooling coils 74 and 76, respectively, through which is circulated a cooled heat transfer media, preferably received from a heat energy recovery system and serves to remove the heat absorbed by the condensing of the steam emissions moving into contact with the surfaces.

In order to reduce the transfer of heat into the internal cooling coils 74 and 76 from ambient surroundings, suitable insulated enclosures 73 are provided which may be mounted atop the housing ceiling 78.

In order to deflect the condensing water to prevent dripping onto the workpieces and other equipment along the treatment stages, a pair of deflector panels 80 and 82 are provided positioned beneath the condenser surfaces 66 and 68 and sloping downwardly over the upper region of the tunnel enclosure 10. Lip portions 84 and 86 are provided at the upper ends of the deflector panels 80 and 82 and extend intermediate the condenser surfaces 66 and 68. Thus, water condensed runs downwardly along the surface of the condenser surface and drips onto the deflector panels 80 and 82. The outer ends of the deflector panels 80 and 82 are adjacent the sidewalls of the tunnel enclosure 10 and enable the condensed water to drip downwardly into the lower reaches of the casing to be collected into the sump tank 34.

The heat recovery system here takes the form of a heat exchanger and heat pump arrangement as shown in FIG. 3 in which the chilled liquid is circulated through the condenser coils of a heat pump such that the heat energy is transferred out of and thence to a heat utilizing process.

Alternatively, a direct coupling connection of the heat transfer medium flow and lines 75 may be associated with a heat exchanger 92 as seen in FIG. 4 and serves to preheat incoming air received in an inlet ducting 88 associated with a paint spray booth 90 such as to utilize the heat energy contained therein to preheat the air during wintertime operating conditions.

Accordingly, it can be seen that the above recited objects of the present invention have been achieved by this arrangement inasmuch as a relatively simple arrangement is provided for eliminating completely the emission of steam into the surrounding plant areas while at the same time the heat energy represented by the steam is efficiently recycled into the industrial plant to enhance the efficiency. The steam energy in a typical pretreatment plant is not inconsiderable mounting to many millions of BTU's per hour. In addition, the water loss associated with steam exhausted to the atmosphere and the attendant problems thereof are also eliminated.

The utilization of the heat energy in such applications is relatively convenient in such plants. There are many low grade heat utilizing processes potentially defining application for the recovered heat energy in such systems.

The embodiments of the invention in which an exclusive property or privilege is claimed are defined as follows:

1. In a pretreatment plant of the type including an open ended tunnel casing through which workpieces are conveyed for pretreatment operations prior to paint spraying finishing of said workpieces, wherein said conveyance includes an overhead conveyor including hangers extending into said tunnel casing through an overhead slot, a plurality of hot water sprays within said casing for pretreatment of said workpieces, said hot water sprays being directed toward said workpieces and producing steam emissions in said tunnel casing, condenser means disposed within said slot and including cooling fluid conduit means for cooling said condenser means to produce codensation of said steam moving towards said slot after contacting the workpieces, means for catching condensate from said condenser means and directing said condensate away from the workpieces and outside of said casing, and heat recovery means for recovering usable heat from said condensate.

2. The pretreatment plant according to claim 1 wherein said condenser means comprises converging surfaces disposed on either side of and defining said slot, the lower regions thereof being more widely separated than the upper regions thereof, whereby condensate moves downwardly and outwardly on said condenser surfaces.

3. The pretreatment plant according to claim 2 further including means for providing cold water sprays at the open ends of said tunnel casing to catch and condense steam in said casing from the hot water sprays.

4. The pretreatment plant according to claim 3 further including means for collecting water from said cold water spray means, and directing collected water to said heat recovery means, said heat recovery means including heat exchanger means for transferring heat from the collected water and condensate to said hot water spray means.

* * * * *